United States Patent [19]
Bernhardt et al.

[11] Patent Number: 4,800,995
[45] Date of Patent: Jan. 31, 1989

[54] APPARATUS FOR DAMPING COURSES OF MOTION
[75] Inventors: Wolfgang Bernhardt, Korntal-Munchingen; Michael Friedow, Tamm, both of Fed. Rep. of Germany
[73] Assignee: Robert Bosch GmbH, Stuttgart, Fed. Rep. of Germany
[21] Appl. No.: 110,404
[22] Filed: Oct. 20, 1987
[30] Foreign Application Priority Data Dec. 24, 1986 [DE] Fed. Rep. of Germany ....... 3644447

[51] Int. Cl.$^4$ ........................ F16F 9/14; B60G 13/08
[52] U.S. Cl. .................................. 188/319; 188/299; 188/317
[58] Field of Search ........... 188/319, 316, 317, 322.13, 188/322.22, 299, 322.15, 310, 317, 318

[56] References Cited
U.S. PATENT DOCUMENTS

| 4,530,425 | 7/1985 | Veaux et al. | 188/319 |
| 4,535,877 | 8/1985 | Shimokura | 188/319 |
| 4,650,042 | 3/1987 | Knecht et al. | 188/299 |
| 4,696,379 | 9/1987 | Yamamoto et al. | 188/299 |

FOREIGN PATENT DOCUMENTS

| EP797376 | 3/1986 | European Pat. Off. | |
| 3470856 | 2/1985 | Fed. Rep. of Germany. | |
| 3610937 | 10/1987 | Fed. Rep. of Germany. | |
| 7094025 | 5/1955 | France. | |
| 7095506 | 5/1955 | France. | |
| 0549764 | 10/1956 | Italy | 188/319 |

Primary Examiner—Andres Kashnikow
Assistant Examiner—Mark T. Le
Attorney, Agent, or Firm—Edwin E. Greigg

[57] ABSTRACT

An apparatus for damping courses of motion in particular for damping resilient wheel suspension systems in vehicles, having a damping piston that is displaceable inside a jacket tube which separates two work chambers and is connected to a piston rod. Between the work chambers there are flow connections, through which a flow is possible in only one direction, because of a unilateral actuation direction of separate check valves. The flow connections have throttle cross sections the size of which is definable by the position of a control slide inside a guide bore. The control slide is actuated via a control rod leading outside the jacket tube and is movable with two degrees of freedom. A motion in the direction of the first degree of freedom varies the throttle cross sections in the same direction, while a motion of the control slide in the direction of the second degree of freedom varies the throttle cross sections in opposite directions. The proposed apparatus is thus suitable for both passive and active damping control.

15 Claims, 3 Drawing Sheets

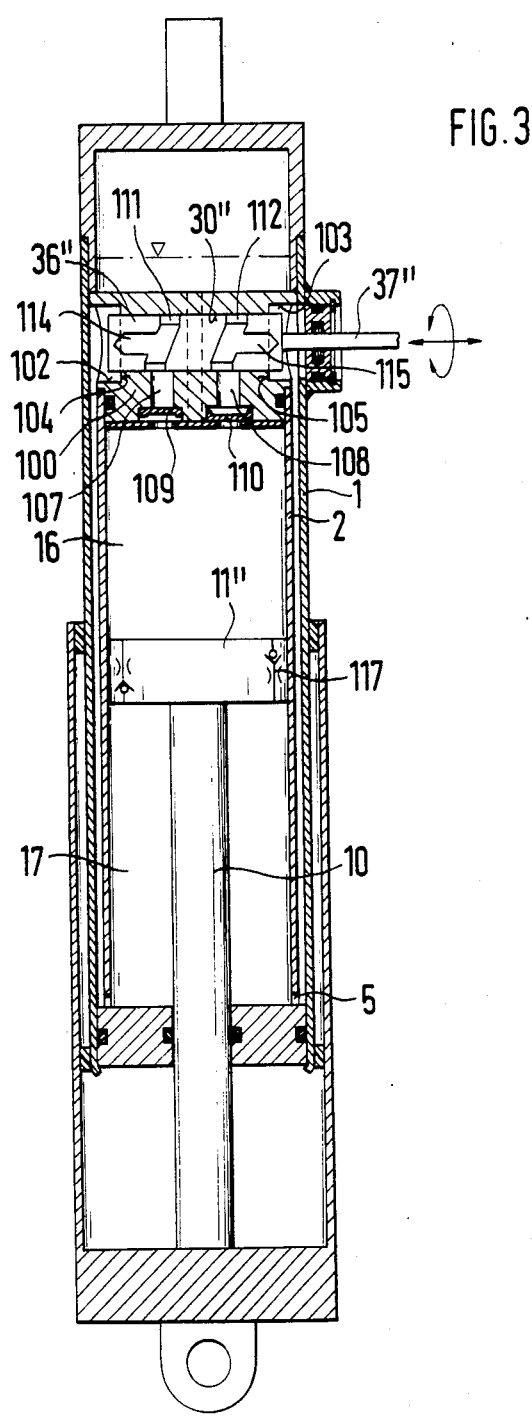

APPARATUS FOR DAMPING COURSES OF MOTION

BACKGROUND OF THE INVENTION

The invention is based on an apparatus for damping courses of motion such as a shock absorber. Apparatuses for damping courses of motion are already known in which a damping piston divides a cylinder filled with pressure fluid into two work chambers that is provided with adjustable overflow openings. To this end, the two work chambers are each connected to one another crosswise and parallel to one another via oppositely oriented valves that allow a flow of the pressure fluid in only one direction. The amount of pressure fluid admitted by these valves at any one time is determined by corresponding triggering of the valves by means of a control device, as a function of suitably prepared sensor signals.

Especially in the field of motor vehicle construction, damping system development is directed to a purposeful adaptation of the damping characteristic to the particular driving status of the vehicle. The directional damper adjustment is effected, for example by means of valves adjustable as a function of control signals, as a function of sensor signals, which detect various driving status parameters (such as vehicle speed, vehicle inclination, transverse and vertical acceleration, and up-and-down, pitch and roll motions).

Among the control signals, a distinction can be made between so-called passive control signals, which are directed to slow, adaptive adaptation of the damping, for example as a function of the kind of ride desired by the driver, road conditions or the vehicle speed, and so-called active control signals, which are intended to bring about a direct change in the absolute speed of the vehicle chassis such as raising, lowering, pitch, roll within the shortest possible period of time. The entire damping system may be designed in such a way that the passive damping control increases or decreases the damping action in the same direction in terms of tension and compression, while the active damping control makes the damping asymmetrical as a function of external signals, or in other words varies the damping action in opposite directions in the compression and tension stage. The overall result is known as a semiactive damper system.

An apparauts for damping courses of motion that is specifically intended to operate in this way is described in German Offenlequnqsschrift No. 36 10 937. The control of the valves here is effected via two valve bodies, actuatable independently of one another, in the form of axially movable slides, which are located outside the actual shock absorber itself.

OBJECT AND SUMMARY OF THE INVENTION

The apparatus according to the invention for damping courses of motion has the advantage of enabling both passive and active damping control at only little engineering expense. The active damping control can be performed asymmetrically; that is, the damping actions in the compression stage and in the tension stage can be varied in opposite directions. A particular advantage is the use of only a single control slide for both the passive and the active damping control, which reduces the structural cost.

It is also particularly advantageous to embody the control slide an an axially and radially movable cylinder. The compact contstruction makes it possible to dispose the control slide inside the shock absorber, and even inside the damping piston.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 1 and 3 are illustrations in full.

DESCRIPTION OF THE PREFERRED EMBODIMENTS

Figure 1:
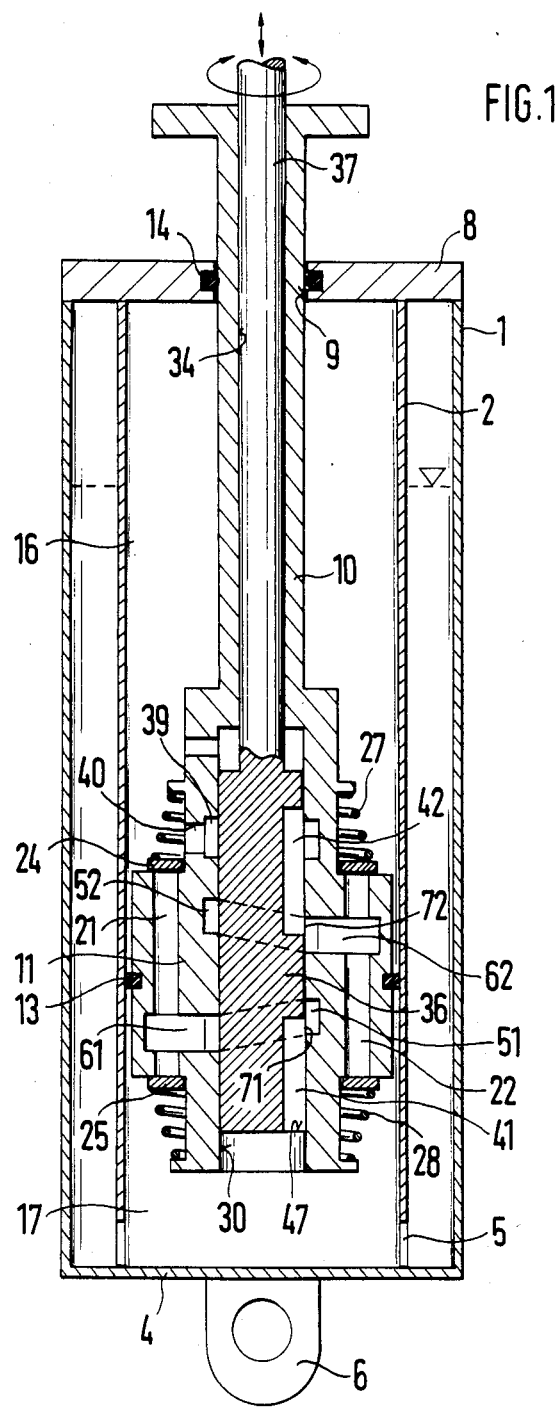

The shock absorber shown in FIG. 1 is a substantial component of the apparatus according to the invention for dampoing courses of motion. It has an outer jacket tube 1, in which an inner jacket tube 2 is concentrically secured. The outer jacket tube 1 is closed at its face end by a bottom 4, and located in the vicinity of the bottom 4 in the inner jacket tube 2 are recesses 5, which enable an overflow of pressure fluid from the annular chamber formed by the jacket tubes 1, 2 into the interior formed by the jacket tube 2. The bottom 4 is firmly attached to a lower fastening device 6 (of the shock absorber). On the other end, the shock absorber is closed by a cap 8, on which both the outer jacket tube 1 and the inner jacket tube 2 rest. The cap 8 has a central piston rod duct 9. The piston rod duct 9 guides a piston rod 10, which continues inside the shock absorber in the form of a damping piston 11. The damping piston 11 is axially displaceable along the inner wall of the inner jacket tube 2 via a seal 13 resting on the inner wall. A further seal 14 is located between the piston rod duct 9 in the cap and the piston rod 10.

The damping piston 11 divides the interior of the inner jacket tube 2 into a first work chamber 16 and a second work chamber 17; the second work chamber 17 communicates via the recess 5 with the annular chamber formed between the inner jacket tube 2 and the outer jacket tube 1. In other words, this is what is known as a double-tube shock absorber. It should be noted at this point, however, that the invention can equally well be realized with a single-tube shock absorber. The damping piston 11 is penetrated axially by a first axially extending bore 21 and a second axially extending bore 22, each of which discharges at one end into the first work chamber 16 and at the other end into the second work chamber 17. Resting on the cap end of the damping piston 11 oriented toward the first work chamber 16 is a first annular flap element 24, while a second annular flap element 25 rests on the face end of the damping piston 11 oriented toward the second work chamber 17. The faces of the flap elements 24, 25 are dimensioned such that they cover the axial bores 21, 22. Acting upon each of the flap elements 24, 25 is the compressive force of springs 27, 28, which are supported at one end by the damping piston 11 and which generate a slight pressure on the flap elements 24, 25 against the opposite ends of axial bores 21, 22. In cooperation with the axial bores 21, 22, the flap elements 24, 25 thus embody check valves, which always open whenever the pressure in the axial bore 21, 22 exceeds the pressure of the respective work chamber 16, 17 in contact with the particular flap element 24, 25. A flow through each of the axial bores 21, 22 is possible in only one direction. However, this aspect will be discussed in further detail hereinafter.

An axially extending guide bore 30 is machined into the damping piston 11, opening at one end into the second work chamber 17 and at the other end continuing completely through the damping piston in the form of a further guide bore 34 of lesser diameter. A cylindrical control slide 36 is located with slight radial play in the guide bore 30 and is firmly connected to a control rod 37 displaceably supported in the further guide bore 34. The control rod 37 completely penetrates the piston rod 10 and is connected in a manner not shown with control elements, such as electric motors or electromagnets, located outside the shock absorber. The control slide 36 and the control rod 37 are both axially displaceable and rotatable inside the guide bore 30 and further guide bore 34. These motions are realized via the control elements. The technique for producing such motions with two degrees of freedom need not be described here, because it is familiar to anyone skilled in the art.

An inner circumferential groove 39 is machined into the guide bore 30 and communicates via at least one radial connecting bore 40 in the damping piston with the first work chamber 16. A first longitudinal slit 41 that extends primarily axially is machined into the jacket face of the control slide 36, for instance in the form of a groove or flattened portion of the face beginning at the lower end of the control slide 36. Besides the first longitudinal slit 41, a second longitudinal slit 42 is also machined into the jacket face of the control slide 36 spaced from and above slit 41, for instance extending in alignnment with the first longitudinal slit 41 and having approximately the same form as the first. However, the narrow side 47 of the first longitudinal slit 41 that is oriented toward the second work chamber 17 is open and discharges into the second work chamber. The axial length of the second longitudinal slit 42 is selected such that in every position of the control slide 36 relative to the guide bore 30, this slit 42 forms a free, unthrottled flow cross section; that is, the second longitudinal slit 42 communicates continuously with the first work chamber 16 via the circumferential groove 30 and the connecting radial bore 40.

Also machined into the guide bore 30, besides the circumferential groove 39, are a first spiral groove 51 and a second spiral groove 52, the form of which can be described as follows:

The first spiral groove 51 surrounds the control slide 36 over at least part of its circumference and is axially offset over the course of its length. In other words, the first spiral groove 51 takes a course similar to the thread pitch of an internal thread. The second spiral groove 52 is located above the first spiral groove 51, or in other words more toward the first work chamber 16. The second spiral groove surrounds the control slide 36 preferably over the same length of its inner circumference as the first spiral groove 51, but has an opposite inclination as compared with the first spiral groove 51. The first spiral groove 51 communicates via a first connection chamber 61 with the first axial bore 21, while the second spiral groove 52 communicates via a second connecting chamber 62 with the second axial bore 22. The spiral grooves 51, 52 have no communication with one another.

As already described, the control slide 36 is axially displaceable as well as rotatable inside the guide bore 30. If the control slide 36 is in a middle axial positoin, as shown in FIG. 1, then the portion of the first longitudinal slit 41 toward the second work chamber 17 covers the first spiral groove 51 by the same extent as the portion of the second longitudinal slit 42 oriented toward the first work chamber 16 covers the second spiral groove 52. The area of overlap between the first longitudinal slit 41 and the first spiral groove 51 will hereinafter be called a first throttle cross section 71, and the area of overlap between the second longitudinal slit 42 and the second spiral groove 52 will be called a second throttle cross section 72.

If the shock absorber shown and described above is subjected to pressure, then damping fluid is positively displaced out of the second work chamber 17 into the first work chamber 16. The fluid flows via the narrow side 47 into the first longitudinal slit 41, from whence it flows via the first throttle cross section 71 into the first spiral groove 51, flows through the first connecting chamber 61 and the first axial bore 21, and via the check valve formed by the first annular flap element 24 reaches the first work chamber 16.

If the shock absorber is extended then damping fluid flows out of the first work chamber 16 into the second work chamber 17. In this process, the fluid flows via the connecting bore 40 and the circumferential groove 39 into the second longitudinal slit 42, from there the fluid flows via the second throttle cross section 72 into the second spiral groove 52, then flows through the second connecting chamber 62 and the second axial bore 22, and via the check valve formed by the second annular flap element 25 finally reaching the second work chamber 17.

The apparatus functions as follows:

The magnitude of the dmaping action is determined by the size of the smallest flow cross section between the first work chamber 16 and second work chamber 17. These flow cross sections are varied, in the shock absorber described here, by means of the throttle cross sections 71, 72. How the throttle cross sections 71, 72 are varied (that is, whether in the same direction or in opposite directions) is determined by the positioning of the control slide 36. If the control slide 36 is rotated through the control element by means of the control rod 37, then the throttle cross sectoins 71, 72 expand or shrink in the same manner, that is, in the same direction. This kind of same-direction variation is desirable whenever the apparatus for damping courses of motion is intended to effect a passive damping control, or in other words a slow, adaptive adaptation for instance as a function of the ride desired by the driver, road conditions, or vehicle speed. The damping action, in terms of tension and compression, of the shock absorber increases or decreases in the same direction.

If contrarily the control slide 36 is moved axially, then the throttle cross sections 71, 72 vary in opposite directions: If the control slide 36 is moved toward the first work chamber 16, then the second throttle cross section 72 becomes smaller and the first throttle cross section 71 becomes larger. As a result, the damping is increased with tension and decreased with compresson. If the control slide 36 is moved in the direction toward the second work chamber 17, then the first throttle cross section 71 becomes smaller and the second throttle cross section becomes larger. As a result, the damping is increased with compression and decreased with tension. By means of an axial motion of the control slide 36 inside the guide bore 30, the damping action is accordingly varied in opposite directions with tension and compression. As a component of an apparatus for damping courses of motion, the shock absorber described above is thus in a position to bring about an active damping control as well, in which an immediate change is to be brought about, in the shortest possible switching intervals, in the particular absolute speed, for example of the vehicle chassis (raising, lowering, pitching, rolling).

The triggering of the control elements that actuate the control rod 37 and the control slide 36 is preferably done as a function of sensor signals, which detect various parameters of the driving status (vehicle speed, vehicle inclination, transverse and vertical acceleration, and up-and-down, pitching and rolling (movements). The pickup and conversion of the sensor signals and the mode of operation of the control elements need not be described in detail here.

The invention is shown and described using a double-tube shock absorber as an example. This should not be understood to restrict the invention, however; the invention is equally well realized with a singletube shock absorber or with any other arbitrary apparatus for damping courses or motion. Nor it is necessary to dispose the control slide 36 having the throttle cross sections 71, 72 inside the damping piston 11 as shown here. The control slide 36 can in fact also be located outside the shock absorber itself; in that case, the communication with the work chambers would be effected via flow conduits also extending outside the shock absorber. However, disposing the control slide 36 inside the damping piston 11 should be considered to be especially advantageous, because in that way the claimed apparatus gains a particularly compact construction.

Figure 2:
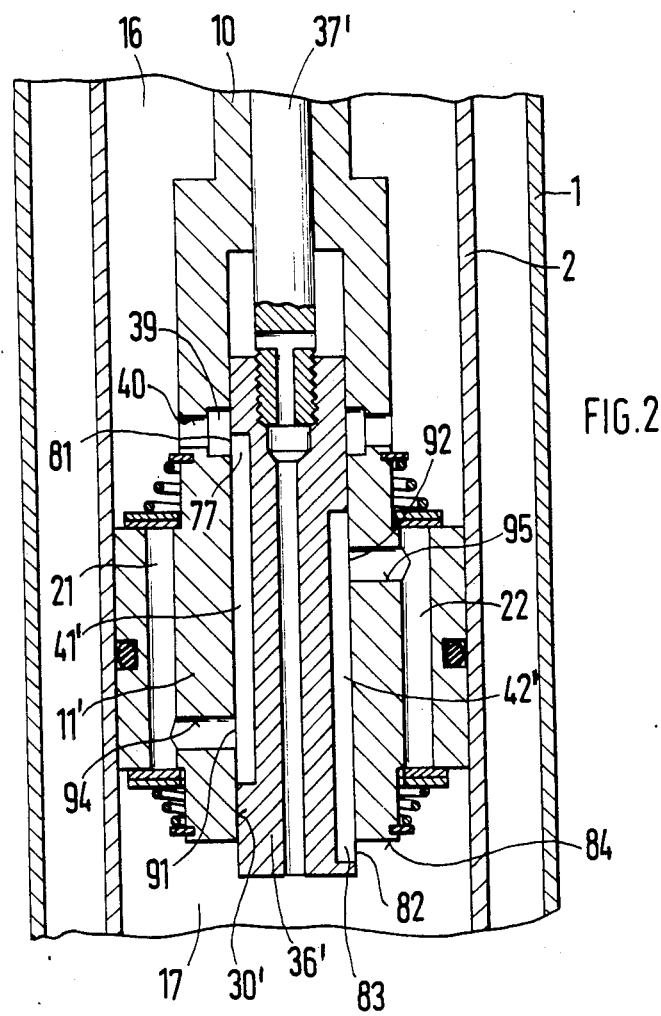
FIG. 2 is a fragmentary illustration, of differently constructed shock absorbers that can be a component of the claimed apparatus for damping courses of motion.

Another exemplary embodiment of the invention is shown in FIG. 2. In contrast to the first exemplary embodiment, in which the positioning of the control slide 36 acts upon the two throttle cross sections 71, 72, four throttles 81, 82, 91, 92 are used. On the one hand, the throttles 81, 91 are embodied by a first longitudinal slit 41', and the throttles 82, 92 by a second longitudinal slit 42' on the other. The second longitudinal slit 42' is rotated by 180° relative to the first longitudinal slit 41' and is also axially offset relative thereto, and the first longitudinal slit 41' protrudes farther toward the first work chamber 16 with the lower end of longitudinal slit 42' approaching chamber 17. The circumferential groove 39 such as present in the first embodiment is again machined into the guide bore 30', communicating via the connecting bore radial 40 with the first work chamber 16. In contrast to the first embodiment, however, in which no throttling function at all is assigned to the circumferential groove 39, the circumferential groove 39 in the second embodiment, along with the end 77 of the first longitudinal slit 41 oriented toward the first work chamber 16, forms the first axially variable throttle 81, the size of which varies with the axial displacement of the control slide 36'. A corresponding second axially variable throttle 82 exists between the end 83, of the second longitudinal slit 42' and a face end 84 of the damping piston 11 oriented toward the second work chamber 17. This second axially variable throttle 82 likewise varies upon axial displacement of the control slide 36'.

By means of a rotational movement of the control slide 36', two throttles 91, 92 that are variable by rotation are varied. The first throttle 91 that is variable by rotation exists between the first longitudinal slit 41' and a first transverse bore 92 in the damping piston 11, which at the other end discharges into the first axial bore 21; the second throttle 92 that is variable by means of rotation exists between the second longitudinal slit 42' and a second transverse bore 92, which at the other end discharges into the second axial bore 22. Flap valves such as valves 24 and 25 are also provided.

It is apparent that a variation of the throttle cross sections that is in the same direction in terms of tension and compression is attained by means of rotation, while a variation in opposite directions is attained by means of axial displacement of the control slide 36'. In contrast to the embodiment shown in FIG. 1, even a slight rotation of the control slide 36' brings about a major variation, in the same direction, of the throttles 91, 92 and hence a pronounced change in the damping characteristic, especially within the passive damping control. Accordingly, only small rotational angles are needed, which may be an advantage, but does not have to be, depending on the intended application.

A further exemplary embodiment of the invention is shown in FIG. 3. The cylindrical control slide 36" is not located in the damping piston 11, but rather in a valve housing 100 secured to the jacket tubes 1, 2. The control rod 37" is extended laterally out of the shock absorber. The control slide 36" is guided over the majority of its length by the guide bore 30". In the vicinity of the ends of the control slide 36", the guide bore 30" merges with a respective enlargement bore 102, 103 of larger diameter, the transition being effected by shoulders 104, 105. The enlargement bores 102, 103 communicate with the second work chamber 17 of the shock absorber via the annular chamber formed between the outer jacket tube 1 and the inner jacket tube 2 and via the recess 5. Two bores 107, 108 discharge at one end of the circumference of the guide bore 30" and on the other end into the first work chamber 16. One check valve 109, 110 each is located in each of the bores 107, 108, and the flow through the check valves 107, 108 takes place in opposite directions.

The partiuclar throttle cross sections that are varied by rotation of the control slide 36" are embodied on the one hand by the bores 107, 108 and on the other by two grooves 111, 112, which are machined on the circumference of the control slide 36" in such a way that they have a pitch comparable to a screw thread. The grooves 111, 112 do not communicate with one another, and they have longitudinal grooves 114, 115 that extend toward the shoulders 104, 105. The longitudinal grooves 114, 115 extend to just before the respective end face of the control slide 36". The throttling that is variable by axial motion of the control slide 36" is determined by the size of the portion of the longitudinal grooves 114, 115 that is no longer located inside the guide bore 30" but instead is already inside the enlargement bores 102, 103. Accordingly, the axial position of the control slide 36" determines the size of those throttle openings that connect the longitudinal grooves 114, 115 with the enlargement bores 102, 103. These throttles again operate in opposite directions; that is, if the portion of the longitudinal groove 114 located inside the enlargement bore 102 increases, then the portion of the longitudinal groove 115 located inside the enlargement bore 103 decreases, and vice versa.

An axial displacement of the control slide 36" accordingly brings about a contrary change in the damping with tension and with compressoin, as is desired for active damping control, while a rotation of the control slide 36" effects a change of the damping in the same direction, as is desired for passive damping control.

In FIG. 3, reference numeral 117 indicates overflow openings located inside the damping piston 11", which are each in the form of a combination throttle element and check valve. This is intended to suggest that the invention certainly allows leaving the basic functions of the shock absorber in the damping piston 11", and realizing only the additional adjustment options via the control slide 36".

In anther feature of the invention, it is also possible for the control element that defines the position of the control slide 36, 36', 36", which may be a pneumatic or hydraulic actuating device, an electric motor, or an electromagnetic actuating device, to be disposed inside the piston rod 10 or inside the damping piston 11, 11', 11". In that case the control rod 37, 37', 37" protruding out of the shock absorber is omitted, but an electrical, pneumatic or hydraulic connection leading into the shock absorber must be provided instead.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An apparatus for damping courses of motion of two bodies or masses such as resilient wheel suspension systems in vehicles that move relative to one another, which comprises a tubular jacket, a damping piston displaceable inside said tubular jacket, said damping piston separating said tubular jacket into first and second work chambers, a piston rod connected to said damping piston, at least two flow connections connecting the work chambers with one another, said at least two flow connections including throttle cross sections arranged to allow a flow therethrough in only one direction of flow, the flow established through each one of said throttle cross sections further being opposite to one another, valve means which vary the size of the throttle flow cross sections, said throttle cross sections being variable in both the same and opposite directions by means of said valve means as a function of motion parameters of the two bodies or masses moving relative to one another, a single control slide in said valve means for varying the size of said throttle cross sections, which control slide is movable with first and second degrees of freedom, in the first degree of freedom of the single control slide, the size of one of said throttle cross sections is decreased and in the second degree of freedom of the single control slide all said throttle cross sections increase or decrease in the same manner.

2. An apparatus as defined by claim 1, in which the sizes of the throttle cross sections vary in the same direction upon a movement of the control slide in the direction of said first degree of freedom; and vary in opposite directions upon a movement of the control slide in the direction of said second degree of freedom.

3. An apparatus as defined by claim 2, in which said control slide is cylindrically embodied and is axially displaceable and rotatable in an axial guide bore of said valve means.

4. An apparatus as defined by claim 3, in which said control slide includes axially displaced longitudinal slits which cooperate with openings that discharge into the guide bore and which define the sizes of at least part of said throttle cross sections.

5. An apparatus as defined by claim 1, in which said control slide is disposed inside said tubular jacket.

6. An apparatus as defined by claim 2, in which said control slide is disposed inside said tubular jacket.

7. An apparatus as defined by claim 3, in which said control slide is disposed inside said tubular jacket.

8. An apparatus as defined by claim 4, in which said control slide is disposed inside said tubular jacket.

9. An apparatus as defined by claim 5, in which said control slide is disposed inside said damping piston.

10. An apparatus as defined by claim 5, in which said control slide is disposed inside said piston rod.

11. An apparatus as defined by claim 5, in which said control slide is connected to a control rod protruding laterally out of said tubular jacket tube.

12. An apparatus as defined by claim 5, which includes at least one non-variable overflow opening connecting said two work chambers jwith one another.

13. An apparatus as defined by claim 6, which includes at least one non-variable overflow opening connecting said two work chambers with one another.

14. An apparatus as defined by claim 7, which includes at least one non-variable overflow opening connecting said two work chambers with one another.

15. An apparatus as defined by claim 8, which includes at least one non-variable overflow opening connecting said two work chambers with one another.

* * * * *